June 11, 1929.    J. KARMAZIN    1,717,038
METHOD AND MACHINE FOR CONSTRUCTING RADIATORS
Filed April 16, 1925    2 Sheets-Sheet 1
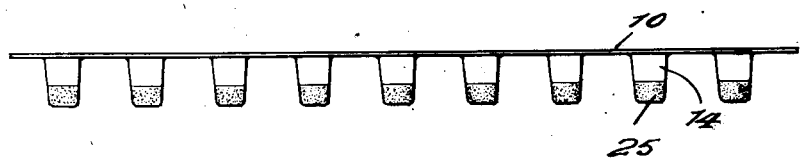
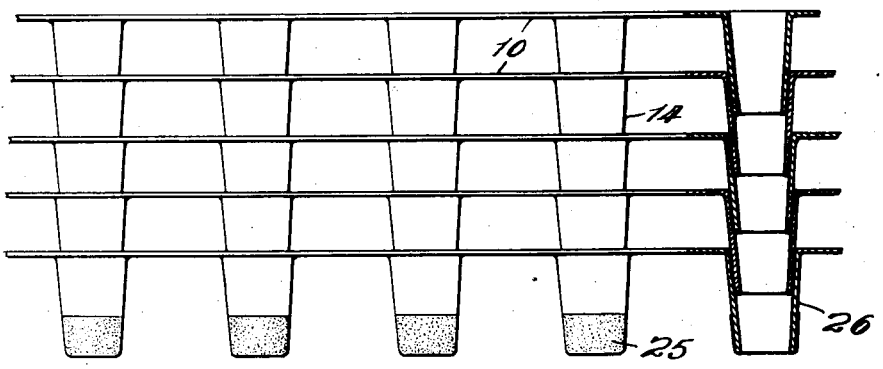
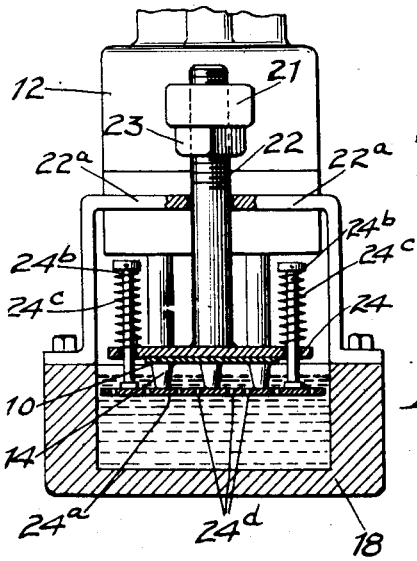
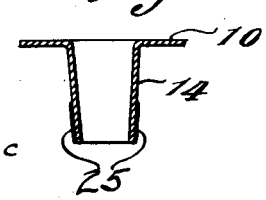
INVENTOR
JOHN KARMAZIN
BY
ATTORNEYS

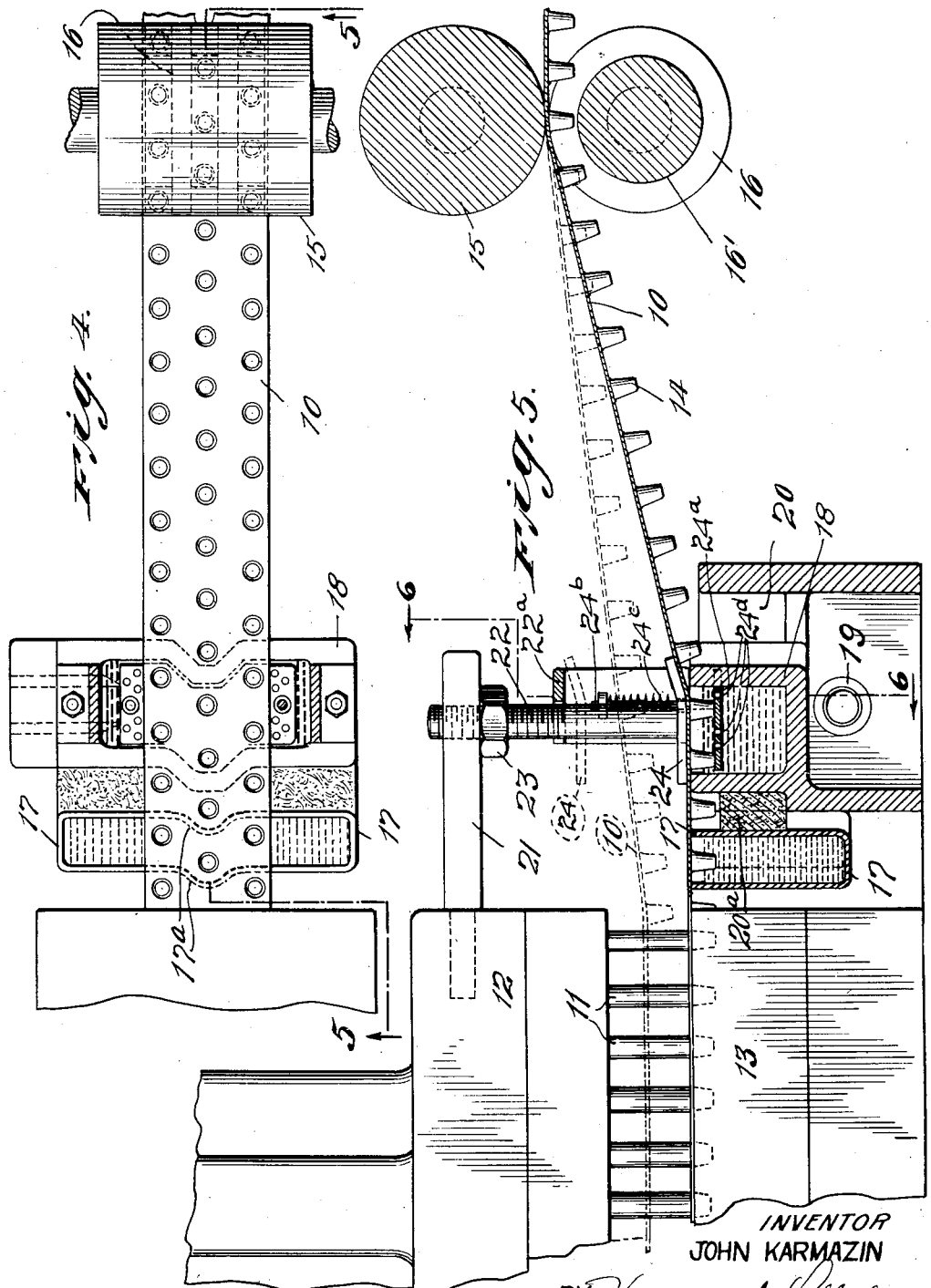

Patented June 11, 1929.

1,717,038

UNITED STATES PATENT OFFICE.

JOHN KARMAZIN, OF DETROIT, MICHIGAN.

METHOD AND MACHINE FOR CONSTRUCTING RADIATORS.

Application filed April 16, 1925. Serial No. 23,533.

This invention relates to radiators and the means and method of their manufacture. For the purpose of illustration, I have shown the novel apparatus in a form adapted for attachment to, or use with, the radiator making machine disclosed in my prior copending application Ser. No. 723,860, filed July 3, 1924.

In said prior application I have shown a combination machine for forming tubular projections from a substantially flat sheet, severing sections of the sheet into radiator elements with the tubes projecting therefrom, stacking such elements with the tube sections of adjacent elements in telescoping relation, and pressing the stack of elements thus formed together to form the cooling section of a radiator. The elements are prepared by first forming relatively broad and shallow depressions in a strip of sheet metal, and thereafter progressively reforming said depressions into cups of the desired depth and shape, punching the bottoms from the cups to form short tubes, and then cutting the strip into elements of the desired length. The elements thus formed are received on a suitable vertically movable table, the table being lowered as successive elements are placed thereon, and the machine automatically stopped when the desired number of elements have been thus superposed. The stack of elements is then compressed to form a cooling section and removed, after which the machine is again set in operation.

It is an object of this invention to provide means for coating with solder the telescoping parts of the tube sections of the radiator elements of the type shown in my prior application above identified.

Another object of the present invention is to provide means for applying a coating of solder to the lower portion of the tubular projections of the radiator forming elements which are to subsequently form a fluid tight joint with the tube of the adjacent element at the time and as a part of the process of forming said elements.

A further object of the invention is to provide an improved radiator comprising telescoping parts, one of which has been coated with solder prior to its assembly with the other to permit soldering of the radiator without using an excess of solder and without retarding the cooling efficiency of the radiator.

Another object of the invention is to provide a method and means for economically soldering together the telescoping portions of the tubes of my radiator without using an excess of solder and without coating any more of the heat dissipating surfaces of my radiator with solder than is necessary to make the same watertight.

With these and other objects in view, my invention consists in the novel methods and devices which will be hereinafter described and are illustrated in the drawings.

In the drawings:

Fig. 1 is an elevation of a radiator element with solder applied to the telescoping part of the tubes.

Fig. 2 is an elevation, partly in section, of a small section of a radiator, made in accordance with my invention.

Fig. 3 is an enlarged sectional elevation of a single tube with its coating of solder.

Fig. 4 is a fragmentary plan view of a machine similar to the machine shown in my prior application above identified, showing my soldering appliance attached thereto.

Fig. 5 is a fragmentary elevation of said machine, partly on the line 5—5 of Fig. 4.

Fig. 6 is a section of the soldering tank taken on the line 6—6 of Fig. 5.

As described in my copending application above identified, the radiator element forming strip 10 is prepared from a strip of sheet metal by the progressive action of die plungers 11 attached to the reciprocating head 12. The action of the die plungers 11 and the corresponding die recesses or matrices in the bed plate 13, forms from the strip, the tapering tubular projections 14, the strip illustrated comprising three rows of such projections.

In the operation of the forming machine, as the die head 12 rises to its upper dotted line position, the strip 10 also rises, as indicated in dotted lines in Fig. 5, to enable the projections 14 to clear the die recesses or matrices in the bed plate 13 and permit the strip 10 to be advanced for the next forming operation. The strip is fed forward between the operations of the die head 12 by the rollers 15 and 16, the roller 16 being grooved as indicated at 16′ to receive the tube projections 14. This strip forming and feeding machine and the operation thereof is fully described in my prior copending application above identified.

To provide for the dipping or coating of ends of the tubes 14 with solder prior to the assembly of the radiator elements into a cooling section, I have placed, adjacent to the bed plate 13 of the forming machine or die, a supporting structure comprising two liquid containing reservoirs, 17 and 18. As illustrated, the reservoir 17 has the width corresponding to the distance of the tube sections 14 which are spaced on this strip 10, and its lateral walls are offset at the center 17$^a$, as shown in Fig. 4, to embrace a tube 14 in the center row on the strip 10 simultaneously with a tube in each of the outer rows. The reservoir 18 is wide enough to simultaneously receive two tubes in each row, and its center portion is offset in the same manner as the center of reservoir 17, and for the same purpose. The reservoir 17 contains a cleaning and fluxing fluid, such as muriatic acid, and the reservoir 18 contains molten solder. The reservoir 18 is heated by a suitable flame from the nozzle 19, which projects into a chamber beneath the reservoir, the products of combustion escaping through suitable openings 20. Preferably an asbestos, or other non-conducting packing 20$^a$ is inserted between the solder pot 18 and the flux pot 17 to prevent heating of the flux.

To intermittently depress the strip so that the ends of the tubes dip into the flux and the solder, then permit the strip to rise clear of the tops of the reservoirs 17 and 18, the following device is provided. An arm 21 is rigidly attached to the reciprocating die head 12, and extends therefrom above the solder tank 18. A vertical rod 22 is adjustably secured to the arm 21, as by threading into an opening in said arm, and a lock nut 23 secures the rod in place. At its lower end the rod carries a shoe 24 adapted to engage the strip 10 when the die head 12 is depressed and immerse the lower portion of the tubes 14 in the soldering baths.

The operation of the device may be summarized as follows: When the die head 12 and shoe 24 descend, the strip 10 is pressed down by the shoe into the position shown in full lines in Fig. 5, in which position the ends of two tubes in each row dip into the solder in the reservoir 18 and the ends of one tube in each row dip into the cleaning and fluxing fluid in the reservoir 17. When the die head 12 rises, the shoe moves upward to the dotted line position, and the strip 10 also moves upward to its dotted line position (Fig. 5) and while thus free from the dies the strip moves forward a distance equal to the longitudinal spacing of the tubes, as described in the aforementioned application. The forming and dipping operation is then repeated. Thus, each transverse group of tubes is in turn dipped once into the flux and is subsequently dipped twice into the solder. As only the lower outer walls of the tubes 14 contact with the tubes of the adjacent strip, it is desirable to coat only the outer walls of the tubes with solder, leaving the inner walls uncoated and therefore unimpaired in radiating efficiency (the solder being relatively a poor heat conductor). To prevent the entrance of the solder into the inside of the tubes, a bottom cover plate 24$^a$ may be secured to the shoe 24 by means of the bolts 24$^b$, which extend through openings in the plate 24 and these bolts 24$^b$ above the plate 24 may be surrounded with coil springs 24$^c$ which normally urge the plate 24$^a$ toward the plate 24 to grip the strip 10 and tubes 14 therebetween. Suitable stops 22$^a$ may be provided on the frame of the forming machine, which contact with the top of the bolts 24$^b$ on their upward movement and arrest the movement of the plate 24$^a$ while permitting plate 24 to rise so as to release the strip to permit it to be pulled forward by the feed rolls 15 and 16. Holes 24$^d$ are provided in the plate 24$^a$ to allow the solder to pass therethrough and surround the tubes 14 when the plate is lowered. It is to be understood, of course, that the plate 24$^a$ may be omitted and both the inside and outside of the tubes 14 soldered, if desired. If desired, protuberances may be provided on the plate 24$^a$ to project into the bottom of tube 14 to more effectively seal the same against the entrance of solder therein. No means is provided to prevent the entrance of the cleaning fluid into the tubes, as no serious harm results therefrom. As a result of the use of plate 24$^a$, the ends of the tubes receive a coating 25 of solder, as shown in Fig. 3. It is to be noted that only the end sections, which telescope into the adjacent tubes are thus coated. Since the solder is a relatively poor conductor of heat, it is desirable that the part 26 (Fig. 2) and the inside of the tube, which is not to be joined to the adjacent tube, should be free from solder so as to provide a metal conducting path of relatively high heat conductivity for conducting away a portion of the heat from the fluid passing through the tubes 14.

When the radiator cooling section has been formed by stacking and pressing together a plurality of elements comprising tubes whose ends have been coated with solder, the section may be heated sufficiently to again melt or soften the solder and thus firmly and tightly secure or sweat the telescoped ends of the tubes together.

It is to be understood that the invention is not limited to the soldering or dipping of the ends of the tubes in the forming machine or during the forming operation but that the formed elements may be dipped by hand or otherwise within the spirit of the invention, and that the embodiment of the invention which has been described and shown in the drawings is to be considered as illustrative rather than restrictive, the invention being limited only by the appended claims.

I claim:

1. A radiator making machine comprising in combination, means for forming tube sections on a strip of sheet metal, and means for coating the ends of said tube sections with solder, said second means being periodically operated by said first means.

2. A radiator making machine comprising in combination means for forming tube sections on a strip of sheet metal, and means for dipping the ends of said tube sections first into a cleaning and fluxing solution, then into molten solder, said second means being periodically operated by said first means, the ends being dipped more than once in the solder.

3. A radiator making machine comprising in combination a die for forming tube sections on a strip of sheet metal, means for closing the ends of said tube sections, and means for dipping the ends of said tube sections into molten solder, said last means being automatically and periodically operated by said forming die.

4. A radiator making machine comprising a reciprocating die adapted to form tube sections on a strip of sheet metal, a stationary die cooperating with said reciprocating die, fluid containing reservoirs adjacent said stationary die, and means associated with said reciprocating die adapted to intermittently depress said tube sections into said fluid containing reservoirs.

5. A radiator making machine comprising a die adapted to form tube sections on a strip of metal, a reservoir for solder and means associated with said die adapted to depress the ends of said tube sections into said solder reservoir at each operation of said die.

6. A radiator making machine comprising a reciprocating die adapted to form tube sections on a strip of sheet metal, a reservoir containing a cleaning and fluxing fluid, a second reservoir containing solder, means for heating said solder, and means associated with said reciprocating die adapted to depress the ends of said tube sections successively into the cleaning and fluxing fluid and the solder and between operations to permit said tube sections to be raised clear of said reservoirs to allow forward movement of said strip.

7. The method of making a radiator which consists in forming tapering tube sections on a strip of sheet metal, applying solder to the ends of said tube sections, superposing elements consisting of successive lengths of said strip with said tube sections in telepscoping relation and pressing the stack of elements together to form a radiator cooling section and heating to fuse the solder and effectively seal the telescoped sections.

8. The method of making a radiator which comprises the steps of forming tube sections of substantially circular cross section on a strip of sheet metal, and coating the ends of said sections with solder by dipping them once into a cleaning and fluxing fluid, then more than once into molten solder, subsequently telescoping adjacent tube sections together to make continuous tubes throughout the unit and finally heating to melt the solder into the joints.

9. The method of making a radiator which comprises forming tube sections on a strip of sheet metal, immersing the ends of said tube sections first into a cleaning and fluxing fluid, automatically closing the ends of said tube sections only while immersing said tube sections into molten solder, superposing successive lengths of the strip thus treated with the tube sections thereof in telescoping relation, and heating to melt the solder to form a radiator cooling section In testimony whereof I have affixed my signature to this specification.

JOHN KARMAZIN.